: (12) United States Patent
Shimizu et al.

(10) Patent No.: US 8,984,874 B2
(45) Date of Patent: Mar. 24, 2015

(54) POWER TRANSMISSION DEVICE

(75) Inventors: Tetsuya Shimizu, Anjo (JP); Tomomi Ishikawa, Anjo (JP); Tomoya Jinno, Anjo (JP); Kenichi Tsuchida, Nishio (JP); Kazunori Ishikawa, Toyota (JP)

(73) Assignee: Aisin AW Co., Ltd., Anjo (JP)

( * ) Notice: Subject to any disclaimer, the term of this patent is extended or adjusted under 35 U.S.C. 154(b) by 647 days.

(21) Appl. No.: 13/281,809

(22) Filed: Oct. 26, 2011

(65) Prior Publication Data
US 2012/0144818 A1 Jun. 14, 2012

(30) Foreign Application Priority Data

Dec. 9, 2010 (JP) .................................. 2010-274704

(51) Int. Cl.
*F15B 11/08* (2006.01)
*F04B 17/03* (2006.01)
*F04B 17/05* (2006.01)
*F16H 61/00* (2006.01)
*F16H 61/02* (2006.01)

(52) U.S. Cl.
CPC .................. *F04B 17/03* (2013.01); *F04B 17/05* (2013.01); *F16H 61/0021* (2013.01); *F16H 61/0206* (2013.01); *F16H 61/0031* (2013.01)
USPC ............................................. 60/428; 60/430

(58) Field of Classification Search
CPC ............ F16H 61/0031; F16H 61/0206; F16H 61/2658
USPC ............................................ 60/428, 429, 430
See application file for complete search history.

(56) References Cited

U.S. PATENT DOCUMENTS

| 2005/0064975 A1 | 3/2005 | Takagi et al. |
| 2007/0217930 A1 * | 9/2007 | Chiu et al. ..................... 417/415 |
| 2009/0301588 A1 * | 12/2009 | Shimizu et al. .......... 137/625.64 |
| 2010/0181159 A1 * | 7/2010 | Shimizu et al. ............ 192/85.63 |
| 2010/0193313 A1 | 8/2010 | Shimizu et al. |

FOREIGN PATENT DOCUMENTS

| JP | A-2005-090659 | 4/2005 |
| JP | A-2010-169249 | 8/2010 |
| JP | A-2010-175039 | 8/2010 |

OTHER PUBLICATIONS

Jan. 24, 2012 (mail date) International Search Report issued in International Application No. PCT/JP2011/077243 (w/translation).

* cited by examiner

*Primary Examiner* — Dwayne J White
*Assistant Examiner* — Matthew Wiblin
(74) *Attorney, Agent, or Firm* — Oliff PLC

(57) ABSTRACT

A power transmission device that transmits power from a motor to a wheel via a hydraulically driven friction engagement element and that includes a mechanical pump driven by the motor to produce a hydraulic pressure that is regulated by a pressure regulating valve; an electric pump that produces a hydraulic pressure; a switching mechanism that either switches an output pressure of the regulating valve or an output pressure of the electric pump to a servo of the engagement element based upon a signal pressure, and a drain valve that opens to drain oil when a hydraulic pressure of a preset pressure or more is applied, and the switching mechanism connects to the drain valve to allow communication between the electric pump and the drain valve in the first state, and shut off communication between the electric pump and the drain valve.

6 Claims, 7 Drawing Sheets

|   |     | C-1 | C-2 | C-3 | B-1 | B-2 | F-1 | SL1 | SL2 | SL3 | SL5 | S1  | S2 |
|---|-----|-----|-----|-----|-----|-----|-----|-----|-----|-----|-----|-----|----|
| P |     |     |     |     |     |     |     |     |     |     |     |     |    |
| REV |   |     |     | O   |     | O   |     |     |     |     |     |     |    |
| N |     |     |     |     |     |     |     |     |     |     |     |     |    |
| D | 1st | O   |     |     |     | (O) | O   | O   |     | (O) |     | (O) |    |
|   | 2nd | O   |     | O   |     |     |     | O   |     |     | O   |     |    |
|   | 3rd | O   |     | O   |     |     |     | O   |     | O   |     |     |    |
|   | 4th | O   | O   |     |     |     |     | O   | O   |     |     |     |    |
|   | 5th |     | O   | O   |     |     |     |     | O   | O   |     |     |    |
|   | 6th |     | O   |     | O   |     |     |     | O   |     | O   |     |    |

(O): ENGAGED WHEN ENGINE BRAKE IS IN OPERATION

F I G . 4
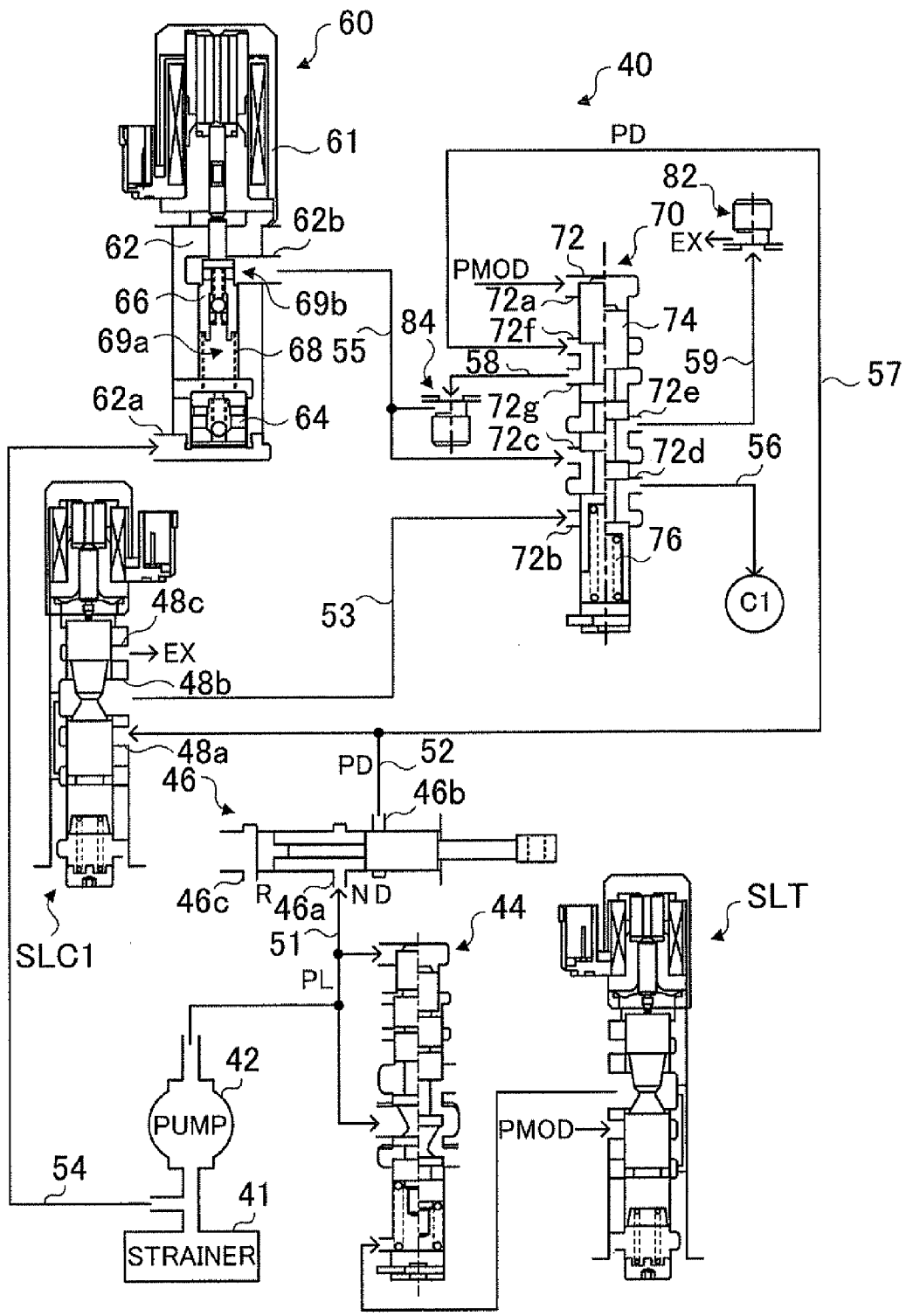

F I G . 6
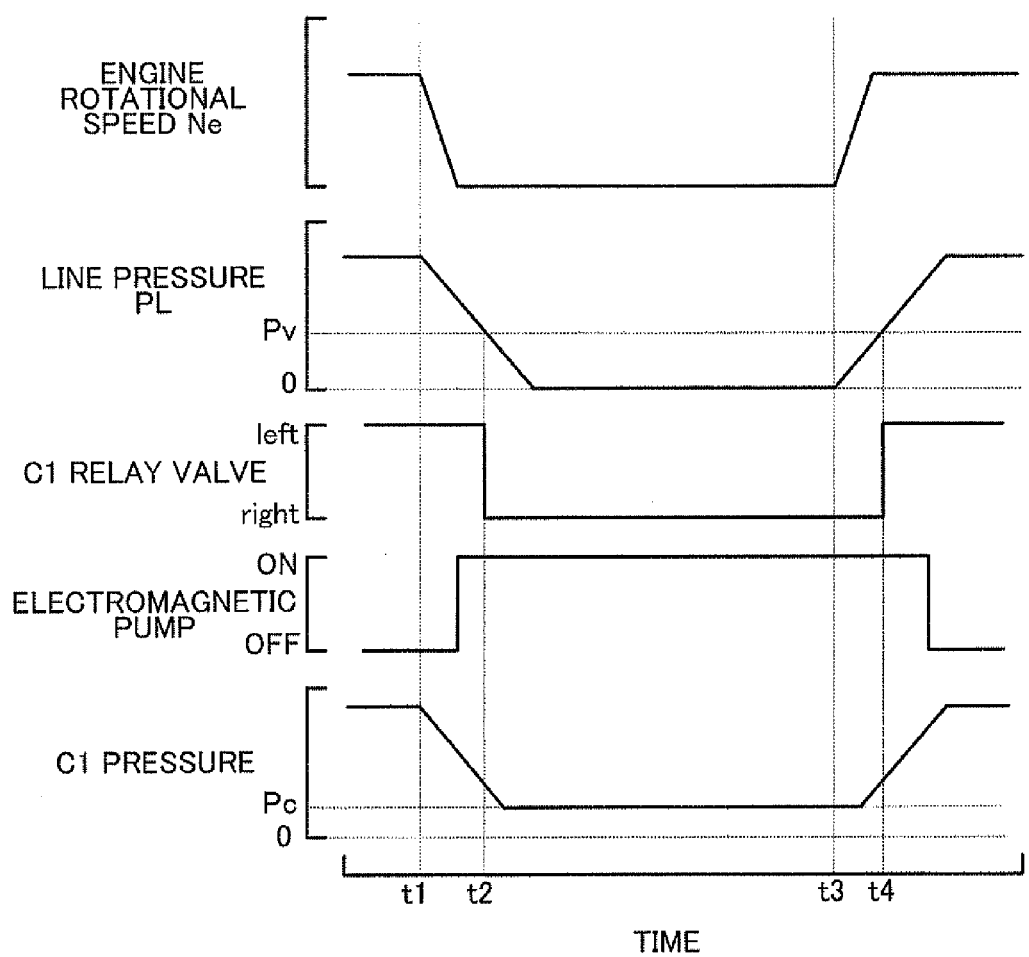

POWER TRANSMISSION DEVICE

INCORPORATION BY REFERENCE

The disclosure of Japanese Patent Application No. 2010-274704 filed on Dec. 9, 2010 including the specification, drawings and abstract is incorporated herein by reference in its entirety.

BACKGROUND OF THE INVENTION

The present invention relates to a power transmission device that is mounted on a vehicle equipped with a motor and transmits power from the motor to a driving wheel side via hydraulically driven friction engagement elements.

DESCRIPTION OF THE RELATED ART

Conventionally, as a power transmission device of such a type as described above, there is proposed a device that is mounted on a vehicle with an idle-stop function, and provided with a mechanical pump operated by power of an engine, a linear solenoid valve SLC1 that regulates a discharge pressure from the mechanical pump, an electromagnetic pump, and a switching valve that is operated by hydraulic pressure (modulator pressure) from the mechanical pump to selectively switch between a connection between an output port of the linear solenoid valve SLC1 and a vehicle start clutch C1 (hydraulic servo) and a connection between a discharge port of the electromagnetic pump and the clutch C1 (for example, refer to Japanese Patent Application Publication No. JP-A-2010-175039). In this device, during an idle stop of the engine, a hydraulic pressure (stroke-end pressure) is applied to the clutch C1 by driving the electromagnetic pump instead of the mechanical pump that is stopped from operating as the engine stops running. Accordingly, the clutch C1 can be engaged immediately when the discharge pressure from the mechanical pump rises at the next engine startup, thereby enabling the vehicle to start smoothly.

SUMMARY OF THE INVENTION

In the power transmission device described above, when the switching valve shuts off the connection between the discharge port of the electromagnetic pump and the clutch C1, an oil passage between the discharge port of the electromagnetic pump and the switching valve forms a closed space. However, oil may leak in from adjacent high-pressure oil passages via joint surfaces of the valve body and sliding surfaces of various valves. Such leak-in of oil occurs also in an oil passage between the output port of the linear solenoid valve SLC1 and the switching valve when the switching valve shuts off the connection between the output port of the linear solenoid valve SLC1 and the clutch C1. Because the linear solenoid valve SLC1 is provided with a drain port, a hydraulic pressure acting through the output port can be drained from the drain port. However, because the electromagnetic pump that is not provided with a drain mechanism cannot drain the oil leaking in, an unexpected excessively high hydraulic pressure may be produced in the oil passage. Such a situation may also occur in a power transmission device that is provided with, instead of the electromagnetic pump, an electric pump operated by power of an electric motor.

It is a main object of a power transmission device of the present invention to hold a hydraulic pressure in an oil passage of an electric pump in an appropriate state when a switching mechanism shuts off the oil passage.

In order to achieve the main object described above, the power transmission device of the present invention employs the following means.

According to an aspect of the present invention, a power transmission device that is mounted on a vehicle equipped with a motor and transmits power from the motor to a driving wheel side via a hydraulically driven friction engagement element includes a mechanical pump that is driven by the power from the motor to produce a hydraulic pressure, a pressure regulating valve that regulates the hydraulic pressure from the mechanical pump, an electric pump that is driven by supplied electric power to produce a hydraulic pressure, a switching mechanism that is formed of one or more switching valves, that is connected to a pressure regulating valve oil passage through which oil output from the pressure regulating valve flows, an electric pump oil passage through which oil discharged from the electric pump flows, and a hydraulic servo oil passage communicated with a hydraulic servo of the friction engagement element, and that selectively switches between a first state in which the pressure regulating valve oil passage is communicated with the hydraulic servo oil passage while communication between the electric pump and the hydraulic servo oil passage is shut off and a second state in which communication between the pressure regulating valve oil passage and the hydraulic servo oil passage is shut off while the electric pump oil passage is communicated with the hydraulic servo oil passage, and a drain valve that opens to drain oil when a hydraulic pressure of a preset pressure or more is applied. In the power transmission device, the switching mechanism is further structured to be connected to a drain oil passage equipped with the drain valve, and to allow communication between the electric pump oil passage and the drain oil passage in the first state and shut off communication between the electric pump oil passage and the drain oil passage in the second state.

The power transmission device of the aspect of the present invention is provided with the switching mechanism that is composed of the one or more switching valves, that is connected to the pressure regulating valve oil passage through which oil output from the pressure regulating valve flows, the electric pump oil passage through which oil discharged from the electric pump flows, and the hydraulic servo oil passage communicated with the hydraulic servo of the friction engagement element, and that selectively switches between the first state in which the pressure regulating valve oil passage is communicated with the hydraulic servo oil passage while communication between the electric pump oil passage and the hydraulic servo oil passage is shut off, and the second state in which communication between the pressure regulating valve oil passage and the hydraulic servo oil passage is shut off while the electric pump oil passage is communicated with the hydraulic servo oil passage, and also provided with the drain valve that opens to drain oil when a hydraulic pressure of a preset pressure or more is applied. The switching mechanism is further structured to be connected to the drain oil passage equipped with the drain valve, and to allow communication between the electric pump oil passage and the drain oil passage in the first state, and shut off communication between the electric pump oil passage and the drain oil passage in the second state. With this arrangement, when the switching mechanism shuts off the connection between the electric pump oil passage and the hydraulic servo oil passage, the electric pump oil passage is connected to the drain oil passage equipped with the drain valve. Therefore, a hydraulic pressure in the electric pump oil passage is regulated by the drain valve. As a result, the hydraulic pressure in the oil passage of the electric pump can be maintained in an appropriate state when the switching mechanism shuts off the oil passage. Here, the term "electric pump" includes an ordinary electric pump operated by power of an electric motor and an electromagnetic pump.

In the power transmission device of the present invention described above, the switching mechanism may further include a signal pressure port connected to the pressure regulating valve oil passage, a first input port connected to the electric pump oil passage, and a drain port connected to the drain oil passage, a spool that allows and shuts off communication between the first input port and the drain port, and an urging member that urges the spool. In the power transmission device, the switching mechanism may be structured so as to allow communication between the first input port and the drain port by moving the spool to one end side by a hydraulic pressure of the preset pressure or more when the hydraulic pressure acts through the signal pressure port, and shut off communication between the first input port and the drain port by moving the spool to the other end side by an urging force of the urging member when the hydraulic pressure of the preset pressure or more does not act through the signal pressure port. In the power transmission device according to this aspect of the present invention, the switching mechanism may further include a second input port connected to the pressure regulating valve oil passage and an output port connected to the hydraulic servo oil passage. In the power transmission device, the switching mechanism may be formed of one switching valve that shuts off communication between the first input port and the output port and allows communication between the second input port and the output port by moving the spool to the one end side by a hydraulic pressure of the preset pressure or more when the hydraulic pressure acts through the signal pressure port, and that allows communication between the first input port and the output port and shuts off communication between the second input port and the output port by moving the spool to the other end side by the urging force of the urging member when the hydraulic pressure of the preset pressure or more does not act through the signal pressure port. With this arrangement, because the functions of the switching mechanism can be achieved by one switching valve, the size of the device can be further reduced.

In the power transmission device of the present invention according to an aspect in which the electric pump is structured as an electromagnetic pump, the electromagnetic pump may be a piston pump that includes an electromagnetic portion that generates an electromagnetic force to move a mover, a piston portion that moves in conjunction with the mover and slides in a cylinder, an urging member that urges the piston portion in a direction opposite to a direction in which the mover is moved by the electromagnetic force, a suction check valve connected to a space surrounded by the piston portion and the cylinder, and a discharge check valve built into the piston portion, and that suctions oil into the space via the suction check valve by reciprocating the piston portion using the electromagnetic portion and the urging member, and discharges the suctioned oil via the discharge check valve. In an electromagnetic pump of the type described above, when a high pressure is applied to the electric pump oil passage, the piston portion is pressed by the high pressure, resulting in cases in which an excessive load is applied to the electromagnetic portion, the urging member, and the like. However, such inconvenience can be prevented from occurring by employing the present invention. Here, the mover and the piston portion may be structured either as a single body, or as separate bodies from each other. Furthermore, in the power transmission device according to this aspect of the present invention, the electromagnetic pump may be a pump that includes a case that supports the mover, and may be capable of producing a hydraulic pressure as the piston portion is moved by the urging force of the urging member, and the mover and the piston portion may be structured as separate bodies from each other. In an electromagnetic pump of this type, when a high pressure is applied to the electric pump oil passage, the piston portion is pressed by the high pressure with the urging member contracted, and thus, the mover is placed in a free state, causing a possibility of interference with the case. However, such inconvenience can be prevented from occurring by employing the present invention.

Further, the power transmission device of the present invention may further include a control unit that controls the pressure regulating valve so as to supply the hydraulic pressure from the mechanical pump to the hydraulic servo when the mechanical pump is in operation, and controls the electric pump so as to supply the hydraulic pressure from the electric pump to the hydraulic servo when the mechanical pump is not in operation.

BRIEF DESCRIPTION OF THE DRAWINGS

FIG. 4 is a block diagram showing a schematic structure of a hydraulic circuit 40;

FIG. 6 is an explanatory diagram showing time-dependent changes of an engine rotational speed Ne, a line pressure PL, an operational state of a C1 relay valve 70, an operational state of the electromagnetic pump 60, and a C1 pressure;

DETAILED DESCRIPTION OF THE EMBODIMENT

An embodiment of the present invention will be described next.

Figure 1:
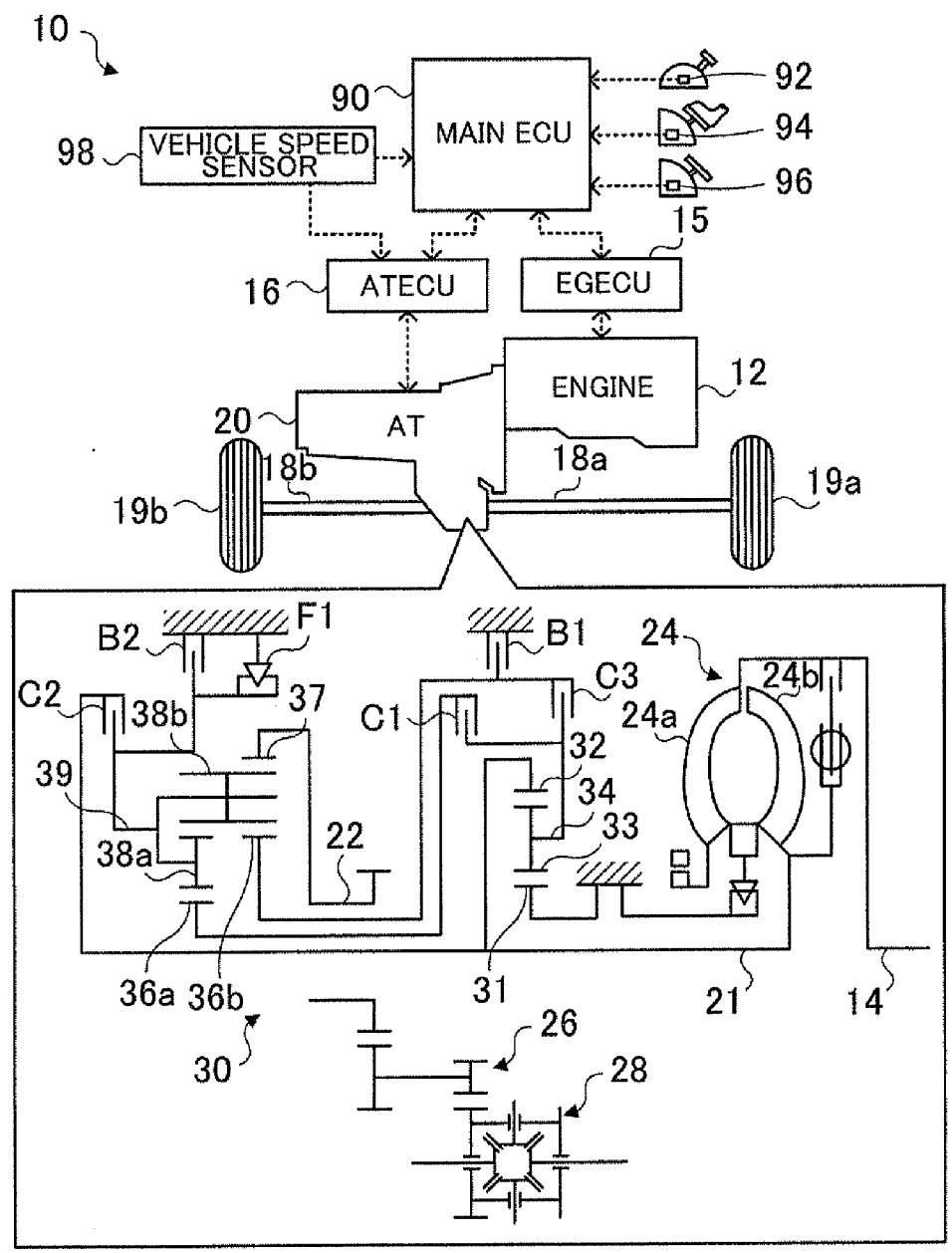
FIG. 1 is a block diagram showing a schematic structure of a vehicle 10 equipped with a power transmission device 20 according to as an embodiment of the present invention.
Figures 2, 3:
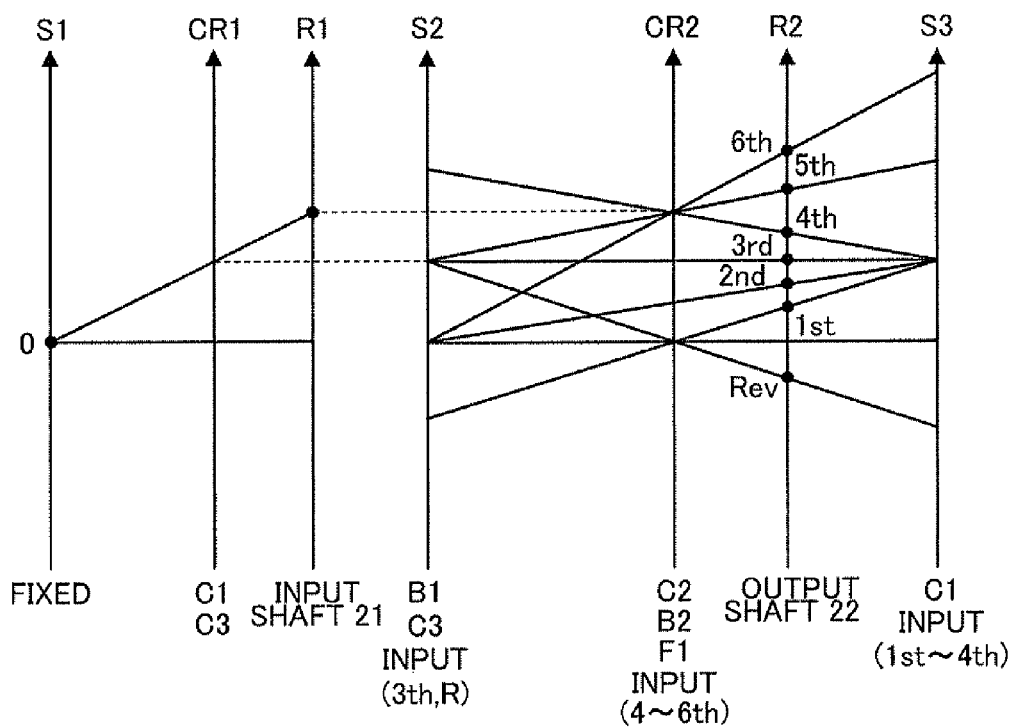
FIG. 2 is an explanatory diagram showing an operation table of a speed change mechanism 30.
FIG. 3 is a collinear diagram showing relationships among rotational speeds of rotational elements of the speed change mechanism 30.

FIG. 1 is a block diagram showing a schematic structure of a vehicle 10 equipped with a power transmission device 20 according to an embodiment of the present invention. FIG. 2 is an explanatory diagram showing an operation table of a speed change mechanism 30.

As shown in FIG. 1, the vehicle 10 is provided with an engine 12 serving as an internal combustion engine that outputs a power by explosive combustion of hydrocarbon-based fuel such as gasoline or diesel oil, an engine electronic control unit (engine ECU) 15 that controls operation of the engine 12, a power transmission device 20 that is connected to a crankshaft 14 of the engine 12 and also connected to left and right axles 18a and 18b of wheels 19a and 19b so as to transmit the power from the engine 12 to the axles 18a and 18b, an automatic transmission electronic control unit (AT ECU) 16 that controls the power transmission device 20, and a main electronic control unit (main ECU) 90 that controls the entire vehicle. Note that the main ECU 90 is supplied via input ports with signals such as a shift position SP from a shift position sensor 92, an accelerator operation amount Ace from an accelerator pedal position sensor 94, a brake switch signal SSW from a brake switch 96, and a vehicle speed V from a vehicle speed sensor 98. Note also that the main ECU 90 is connected to the engine ECU 15 and the AT ECU 16 via communication ports, and communicates with the engine ECU 15 and the AT ECU 16 to send and receive various control signals and data.

As shown in FIG. 1, the power transmission device 20 includes: a torque converter 24 having a lock-up clutch and formed of a pump impeller 24a on the input side connected to the crankshaft 14 of the engine 12 and a turbine runner 24b on the output side; the stepped speed change mechanism 30 that has an input shaft 21 connected to the turbine runner 24b of the torque converter 24 and an output shaft 22 connected to the axles 18a and 18b via a gear mechanism 26 and a differential gear 28, and changes speed of the power supplied to the input shaft 21 and outputs the power to the output shaft 22 at the changed speed; and a hydraulic circuit 40 (refer to FIG. 4) serving as an actuator driving the speed change mechanism 30. Note that, in the embodiment, the torque converter 24 is interposed between the crankshaft 14 of the engine 12 and the speed change mechanism 30. However, the present invention is not limited to this embodiment, and various starting devices may be employed.

The speed change mechanism 30 is structured as a six-speed stepped speed change mechanism, and is provided with a single-pinion type planetary gear mechanism, a Ravigneaux type planetary gear mechanism, three clutches C1, C2, and C3, two brakes B1 and B2, and a one-way clutch F1. The single-pinion type planetary gear mechanism is provided with a sun gear 31 that is an external gear, a ring gear 32 that is an internal gear arranged concentrically with the sun gear 31, a plurality of pinion gears 33 meshing with the sun gear 31 and also with the ring gear 32, and a carrier 34 supporting the plurality of pinion gears 33 in a rotatable and revolvable manner. The sun gear 31 is fixed to a case, and the ring gear 32 is connected to the input shaft 21. The Ravigneaux type planetary gear mechanism is provided with two sun gears 36a and 36b that are external gears, a ring gear 37 that is an internal gear, a plurality of short pinion gears 38a meshing with the sun gear 36a, a plurality of long pinion gears 38b meshing with the sun gear 36b and the plurality of short pinion gears 38a and also meshing with the ring gear 37, and a carrier 39 connecting the plurality of short pinion gears 38a and the plurality of long pinion gears 38b and supporting the short pinion gears 38a and the long pinion gears 38b in a rotatable and revolvable manner. The sun gear 36a is connected to the carrier 34 of the single-pinion type planetary gear mechanism via the clutch C1. The sun gear 36b is connected to the carrier 34 via the clutch C3 and also to the case via the brake B1. The ring gear 37 is connected to the output shaft 22. The carrier 39 is connected to the input shaft 21 via the clutch C2. The carrier 39 is also connected to the case via the one-way clutch F1 and also via the brake B2 that is provided in parallel with the one-way clutch F1.

As shown in FIG. 2, the speed change mechanism 30 can perform switching among first to sixth forward speeds, a reverse speed and a neutral position by combinations of turning on/off (engagement and disengagement) of the clutches C1 to C3 and turning on/off of the brakes B1 and B2. The reverse speed state can be established by turning on the clutch C3 and the brake B2, and turning off the clutches C1 and C2 and the brake B1. The first forward speed state can be established by turning on the clutch C1, and turning off the clutches C2 and C3 and the brakes B1 and B2. In the first forward speed state, the brake B2 is turned on when an engine brake is in operation. The second forward speed state can be established by turning on the clutch C1 and the brake B1, and turning off the clutches C2 and C3 and the brake B2. The third forward speed state can be established by turning on the clutches C1 and C3, and turning off the clutch C2 and the brakes B1 and B2. The fourth forward speed state can be established by turning on the clutches C1 and C2, and turning off the clutch C3 and the brakes B1 and B2. The fifth forward speed state can be established by turning on the clutches C2 and C3, and turning off the clutch C1 and the brakes B1 and B2. The sixth forward speed state can be established by turning on the clutch C2 and the brake B1, and turning off the clutches C1 and C3 and the brake B2. The neutral state can be established by turning off all of the clutches C1 to C3 and the brakes B1 and B2. Note that FIG. 3 shows an explanatory diagram explaining relationships among rotational speeds of rotational elements at respective shift speeds of the speed change mechanism 30. In the diagram, the axis S1 represents a rotational speed of the sun gear 33; the axis CR1 represents a rotational speed of the carrier 34; the axis R1 represents a rotational speed of the ring gear 32; the axis S2 represents a rotational speed of the sun gear 36b; the axis S3 represents a rotational speed of the sun gear 36a; the axis CR2 represents a rotational speed of the carrier 39; and the axis R2 represents a rotational speed of the ring gear 37.

In the speed change mechanism 30, the hydraulic circuit 40 turns on and off (engages and disengages) the clutches C1 to C3, and turns on and off the brakes B1 and B2. As shown in FIG. 4, the hydraulic circuit 40 includes: a mechanical oil pump 42 that is operated by the power from the engine 12 to suction hydraulic oil via a strainer 41 and feed the hydraulic oil by pressure to a line pressure oil passage 51; a regulator valve 44 that regulates the hydraulic oil fed by pressure from the mechanical oil pump 42 to produce a line pressure PL; a linear solenoid valve SLT that drives the regulator valve 44 by regulating a modulator pressure PMOD produced from the line pressure PL via a modulator valve (not shown) and supplying the regulated pressure as a signal pressure to the regulator valve 44; a manual valve 46 that is provided with an input port 46a connected to the line pressure oil passage 51, a D-position (drive position) output port 46b connected to a drive pressure oil passage 52, and an R-position (reverse position) output port 46c, wherein when a shift lever is shifted to the D position, communication between the input port 46a and the D-position output port 46b is allowed and communication between the input port 46a and the R-position output port 46c is shut off; when the shift lever is shifted the R position, communication between the input port 46a and the D-position output port 46b is shut off and communication between the input port 46a and the R-position output port 46c is allowed; and when the shift lever is shifted to the N (neutral) position, communication between the input port 46a and the D-position output port 46b and communication between the input port 46a and the R-position output port 46c are both shut off; a linear solenoid valve SLC1 that is provided with an input port 48a connected to the drive pressure oil passage 52, an output port 48b connected to an output port oil passage 53, and a drain port 48c, and that receives through the input port 48a a drive pressure PD that is an output pressure from the D-position output port 46b, regulates the received pressure, and outputs the regulated pressure from the output port 48b, while draining a part of the received pressure from the drain port 48c; an electromagnetic pump 60 that is provided with a suction port 62a connected to the strainer 41 via a suction port oil passage 54 and a discharge port 62b connected to a discharge port oil passage 55, and that reciprocates a piston 66 by an electromagnetic force produced by a solenoid 61 so as to suction hydraulic oil through the suction port 62a and discharge the suctioned hydraulic oil from the discharge port 62b; a C1 relay valve 70 that selectively switches between a mode in which an SLC1 pressure that is an output pressure from the linear solenoid valve SLC1 is supplied to a hydraulic servo of the clutch C1 and a mode in which a discharge pressure from the electromagnetic pump 60 is supplied to the hydraulic servo of the clutch C1. Here, FIG. 4 shows only the hydraulic pressure supply system for the clutch C1. However, hydraulic pressure supply systems for the clutches C2 and C3 and the brakes B1 and B2 can also be formed of known solenoid valves and relay valves in the same manner.

As shown in FIG. 4, the C1 relay valve 70 includes a sleeve 72 provided with various ports, a spool 74 that slides in the sleeve 72 to connect and disconnect between the ports, and a spring 76 that presses an end face of the spool. As the various ports, the sleeve 72 includes: a signal pressure port 72a receiving the modulator pressure PMOD as a signal pressure to press the spool end face in the direction opposite to an urging force of the spring 76; an input port 72b connected to the output port oil passage 53 to receive the SLC1 pressure; an input port 72c connected to the discharge port oil passage 55 to receive the discharge pressure from the electromagnetic pump 60; an output port 72d connected to a C1 oil passage 56 for the clutch C1; a drain port 72e connected to a drain oil passage 59 equipped with a check valve 82; a communication port 72f connected to the drive pressure oil passage 52 via a bypass oil passage upstream side 57; and a communication port 72g connected to a bypass oil passage downstream side 58. The discharge port oil passage 55 of the electromagnetic pump 60 is connected to the bypass oil passage downstream side 58 via the check valve 84. The check valve 84 allows oil to flow out from the bypass oil passage downstream side 58 to the discharge port oil passage 55, but prohibits oil from flowing from the discharge port oil passage 55 into the bypass oil passage downstream side 58.

In the C1 relay valve 70, the spool 74 is moved in the direction in which the spring 76 is compressed (to a location shown in the right half of the valve in FIG. 4) by the modulator pressure PMOD acting through the signal pressure port 72a if the modulator pressure PMOD is equal to or higher than a pressure (preset pressure) overcoming the urging force of the spring 76. In this state, the input port 72b is communicated with the output port 72d, communication between the input port 72c and the output port 72d is shut off, the input port 72c is communicated with the drain port 72e, and communication between the communication ports 72f and 72g is shut off. Accordingly, the output port 48b of the linear solenoid valve SLC1 is communicated with the clutch C1 (hydraulic servo) via the output port oil passage 53, the input port 72b, the output port 72d, and the C1 oil passage 56, in this order; communication between the discharge port 62b of the electromagnetic pump 60 and the clutch C1 is shut off, and the discharge port 62b of the electromagnetic pump 60 is communicated with the check valve 82 via the discharge port oil passage 55, the input port 72c, drain port 72e, and the drain oil passage 59; and communication between the bypass oil passage upstream side 57 and the bypass oil passage downstream side 58 is shut off. On the other hand, in the C1 relay valve 70, the spool 74 is moved by the urging force of the spring 76 in the direction in which the spring 76 is stretched (to a location shown in the left half of the valve in FIG. 4) when the modulator pressure PMOD equal to or higher than the pressure (preset pressure) overcoming the urging force of the spring 76 is not applied through the signal pressure port 72a. In this state, communication between the input port 72b and the output port 72d is shut off, the input port 72c is communicated with the output port 72d, communication between the input port 72c and the drain port 72e is shut off, and communication between the communication ports 72f and 72g is allowed. Accordingly, communication between the output port 48b of the linear solenoid valve SLC1 and the clutch C1 is shut off; the discharge port 62b of the electromagnetic pump 60 is communicated with the clutch C1 via the discharge port oil passage 55, the input port 72c, output port 72d, and the C1 oil passage 56, in this order; communication between the discharge port 62b of the electromagnetic pump 60 and the check valve 82 is shut off; and the drive pressure oil passage 52 is communicated with the discharge port oil passage 55 via the bypass oil passage upstream side 57, the communication ports 72f and 72g, the bypass oil passage downstream side 58, and the check valve 84.

The check valve 82 is structured so as to open a drain port to drain oil through the drain oil passage 59 when a hydraulic pressure of the drain oil passage 59 is a preset pressure or more, and to close the drain port when the hydraulic pressure of the drain oil passage 59 is below the preset pressure. The check valve 82, though not shown in detail, is provided with a valve element and a spring generating a thrust force in the direction that presses a pressure receiving surface of the valve element against the drain port, and is housed in a valve hole of a valve body. Given that the drain oil passage 59 is connected to the discharge port oil passage 55 via the C1 relay valve 70 (the input port 72c and the drain port 72e) as described above, the check valve 82 thus structured prevents air from inflowing from the drain port to the side of a second pump chamber 69b of the electromagnetic pump 60 by virtue of a checking function of the check valve 82. On the other hand, in the state in which the electromagnetic pump 60 is driven, the C1 relay valve 70 shuts off communication between the input port 72e and the drain port 72e so as to prevent the second pump chamber 69b from being communicated with the drain port. Therefore, the oil discharged from the electromagnetic pump 60 does not flow out from the drain port.

Figure 5:
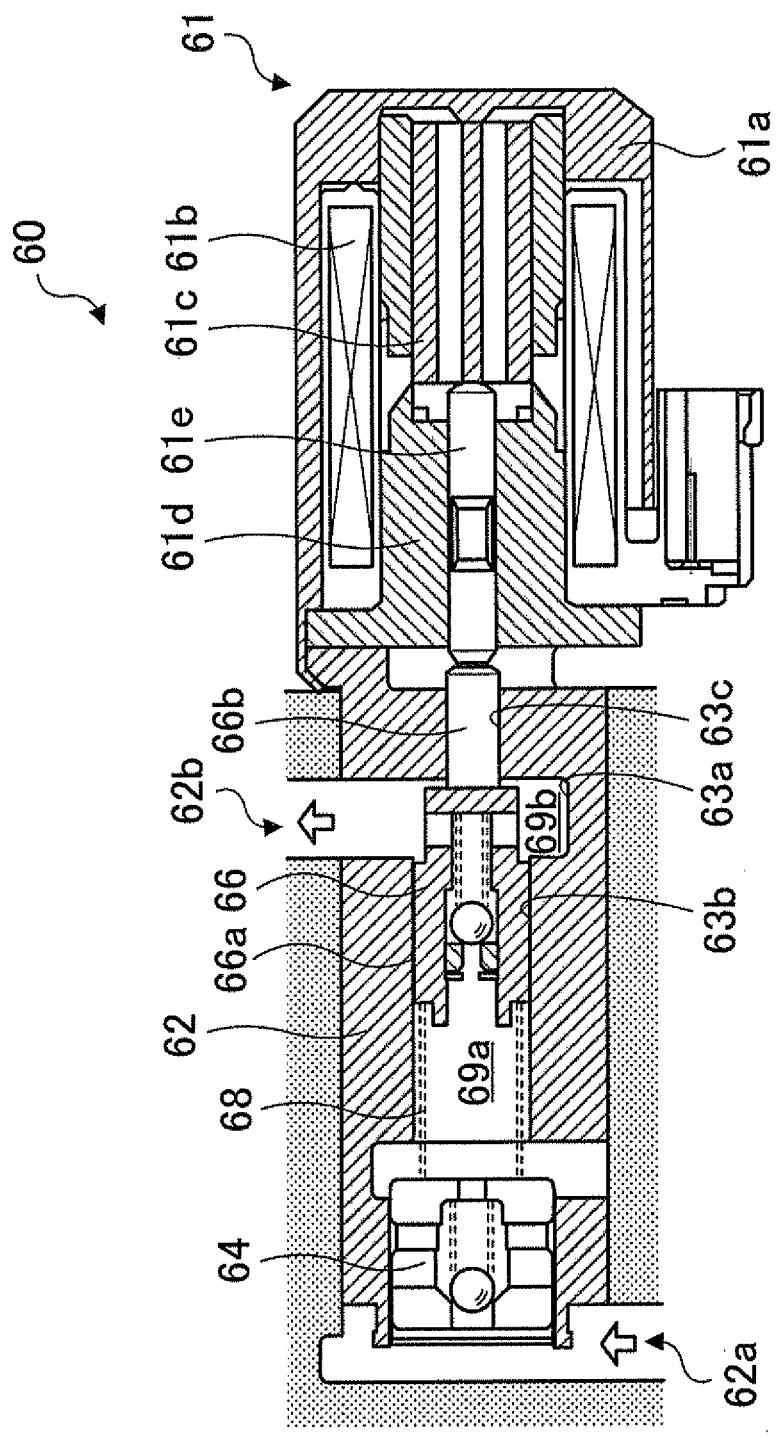
FIG. 5 is a structural diagram showing a schematic structure of an electromagnetic pump 60.

FIG. 5 is a structural diagram showing a schematic structure of the electromagnetic pump 60. As shown in the diagram, the electromagnetic pump 60 is provided with a solenoid 61 generating an electromagnetic force; a cylinder 62 of a hollow cylindrical shape; the piston 66 that is inserted in the cylinder 62 and slidable by receiving a pressure produced by the electromagnetic force from the solenoid 61; an end plate 64 installed in an end portion of the cylinder 62; and a spring 68 that is interposed between the end plate 64 and the piston 66 and applies an urging force to the piston 66 in the direction opposite to the electromagnetic force of the solenoid 61. Thus, the electromagnetic pump 60 is structured as a piston pump that produces a hydraulic pressure by intermittently driving the solenoid 61 to reciprocate the piston 66. A suction check valve that allows the hydraulic oil to flow in from the suction port 62a and prohibits the hydraulic oil from flowing back to the suction port 62a is built into the end plate 64. A discharge check valve that allows the hydraulic oil to flow out to the discharge port 62b but prohibits the hydraulic oil from flowing back from the discharge port 62b is built into the piston 66.

The solenoid 61 is formed of a case 61a serving as a bottomed cylindrical member in which an electromagnetic coil 61b, a plunger 61c serving as a mover, and a core 61d serving as a stator are arranged. In the solenoid 61, the plunger 61c is attracted by a magnetic circuit formed by applying a current to the electromagnetic coil 61b so as to push forward a shaft 61e that is in contact with a distal end of the plunger 61c.

In the cylinder 62, a first pump chamber 69a formed by a space surrounded by an inner wall of the cylinder 62, the end plate 64, and the piston 66 are formed. When the electromagnetic force has been canceled so that the piston 66 is pushed back by the urging force of the spring 68 from the state in which the piston 66 is pushed forward by the electromagnetic force of the solenoid 61, the first pump chamber 69a of the cylinder 62 changes in the direction that increases the volume in the first pump chamber 69a. As a result, the pressure in the first pump chamber 69a is reduced to be lower than the pressure on the suction port 62a side, and therefore the hydraulic oil is suctioned into the first pump chamber 69a. When the piston 66 is pushed forward by the electromagnetic force of the solenoid 61, the first pump chamber 69a changes in the direction that decreases the volume in the first pump chamber 69a. As a result, the pressure in the first pump chamber 69a is increased to be higher than the pressure on the discharge port 62b side, and therefore the hydraulic oil is discharged from the first pump chamber 69a.

The cylinder 62 is also provided, near a portion thereof to which the solenoid 61 is attached, with a sliding surface 63b on which a body portion 66a of the piston 66 slides and a sliding surface 63c on which a shaft portion 66b of the piston 66 slides and that has a smaller inner diameter than that of the sliding surface 63b. The sliding surfaces 63b and 63c are stepped relative to each other with a groove 63a that is carved around the entire circumference of the cylinder 62 interposed therebetween. Thus, a space (second pump chamber 69b) surrounded by the groove 63a and a back surface of the body portion 66a of the piston 66 is formed in the state in which the piston 66 is inserted. This space changes in the direction that increases the volume in the space when the piston 66 is pushed forward by the electromagnetic force of the solenoid 61, and changes in the direction that decreases the volume in the space when the piston 66 is pushed back by the urging force of the spring 68. In the piston 66, a pressure receiving area receiving the pressure from the first pump chamber 69a side is larger than a pressure receiving area receiving the pressure from the second pump chamber 69b side. Therefore, the volume change of the first pump chamber 69a is larger than the volume change of the second pump chamber 69b when the piston 66 is reciprocated. Consequently, when the piston 66 is pushed forward by the electromagnetic force of the solenoid 61, the hydraulic oil of an amount corresponding to a difference between the reduction in the volume of the first pump chamber 69a and the increase in the volume of the second pump chamber 69b is discharged from the first pump chamber 69a through the discharge port 62b, via the discharge check valve built into the piston 66 and the second pump chamber 69b. When the piston 66 is pushed back by the urging force of the spring 68 due to canceling of the electromagnetic force of the solenoid 61, the hydraulic oil of an amount corresponding to the reduction in the volume of the second pump chamber 69b is discharged from the second pump chamber 69b through the discharge port 62b. This makes it possible to discharge the hydraulic oil twice through the discharge port 62b for one reciprocation of the piston 66, whereby discharge variation can be reduced and discharge performance can be improved as well.

In the vehicle 10 of the embodiment thus structured, when the vehicle 10 is running with the shift lever in the D position, the engine 12 is automatically stopped when all of preset automatic stop conditions are satisfied, such as the vehicle speed V being zero, the accelerator being off, and the brake switch signal BSW being on. After the engine 12 is automatically stopped, the engine 12 is automatically started when preset automatic start conditions are satisfied, such as the brake switch signal BSW being off. The main ECU 90 executes the automatic start control and the automatic stop control of the engine 12 as described above by receiving various detection signals, determining that the automatic stop conditions or the automatic start conditions are satisfied, and then sending a control command in accordance with the determination result to the engine ECU 15 and the AT ECU 16.

Here, a case in which the automatic stop conditions are satisfied so that and thus the engine 12 is automatically stopped, and then the automatic start conditions are satisfied so that the engine 12 is automatically started, will be considered. FIG. 6 shows time-dependent changes of an engine rotational speed Ne, the line pressure PL, an operational state of the C1 relay valve 70, an operational state of the electromagnetic pump 60, and a C1 pressure. After the automatic stop conditions are satisfied so that the engine 12 is automatically stopped at time t1, the line pressure PL (modulator pressure PMOD) drops as the rotational speed of the engine 12 drops. When the modulator pressure PMOD becomes lower than the preset pressure of the C1 relay valve 70 (corresponding to the line pressure PL lower than a predetermined pressure Pv) at time t2, the state of the C1 relay valve 70 switches from the state in which the output port 48b of the linear solenoid valve SLC1 is communicated with the clutch C1 to the state in which the discharge port 62b of the electromagnetic pump 60 is communicated with the clutch C1. Therefore, a hydraulic pressure can be applied to the clutch C1 by driving the electromagnetic pump 60. In the embodiment, a hydraulic pressure required for holding a clutch piston of the clutch C1 at a stroke end is applied to the clutch C1. Then, when the automatic start conditions of the engine 12 are satisfied at time t3, a starter motor (not shown) starts cranking the engine 12, and then the line pressure PL (modulator pressure PMOD) increases as the rotational speed of the engine 12 increases. In this case, the C1 relay valve 70 maintains the state in which the discharge port 62b of the electromagnetic pump 60 is communicated with the clutch C1, and communication between the output port 48b of the linear solenoid valve SLC1 and the clutch C1 is shut off, until the modulator pressure PMOD reaches the preset pressure or higher. Therefore, the SLC1 pressure from the linear solenoid valve SLC1 cannot be supplied to the clutch C1 during this period. However, in this state of the C1 relay valve 70, the drive pressure oil passage 52 is communicated with the discharge port oil passage 55 via the bypass oil passage upstream side 57, the communication ports 72f and 72g, bypass oil passage downstream side 58, and the check valve 84. As a result, the line pressure PL (drive pressure PD) is introduced to the discharge port oil passage 55, and supplied from the discharge port oil passage 55 to the clutch C1 via the input port 72c, the output port 72d, and the C1 oil passage 56. When the modulator pressure PMOD reaches the preset pressure or higher at time t4, the C1 relay valve 70 provides communication between the output port 48b of the linear solenoid valve SLC1 and the clutch C1, and thus the SLC1 pressure from the linear solenoid valve SLC1 is applied to the clutch C1, thus completely engaging the clutch C1. In this way, by supplying the hydraulic pressure from the electromagnetic pump 60 to the clutch C1 to cause the clutch C1 to stand by at a stroke-end pressure while the engine 12 is automatically stopped, the clutch C1 can be quickly engaged immediately after the engine 12 is automatically started, thereby allowing smooth starting.

Here, a case in which the spool 74 of the C1 relay valve 70 is stuck (adhered) in the state in which the C1 relay valve 70 provides communication between the discharge port 62b of the electromagnetic pump 60 and the clutch C1 when the clutch C1 is to be engaged to start the vehicle will be considered. In this case, communication between the output port 48b of the linear solenoid valve SLC1 and the clutch C1 is shut off by shutting off communication between the input port 72b and the output port 72d in the C1 relay valve 70. Accordingly, the clutch C1 cannot be engaged by the SLC1 pressure from the linear solenoid valve SLC1. However, in this state, communications between the input port 72c and the output port 72d and between the communication ports 72f and 72g are allowed in the C1 relay valve 70, so as to allow the communication between the drive pressure oil passage 52 and the clutch C1 via the bypass oil passage upstream side 57, the communication ports 72f and 72g, the bypass oil passage downstream side 58, the check valve 84, the discharge port oil passage 55, the input port 72c, the output port 72d, and the C1 oil passage 56, in this order. Accordingly, the drive pressure PD is supplied to the clutch C1 while bypassing the linear solenoid valve SLC1. As a result, the clutch C1 can be engaged to start the vehicle even if the spool 74 of the C1 relay valve 70 is stuck.

Figure 7:
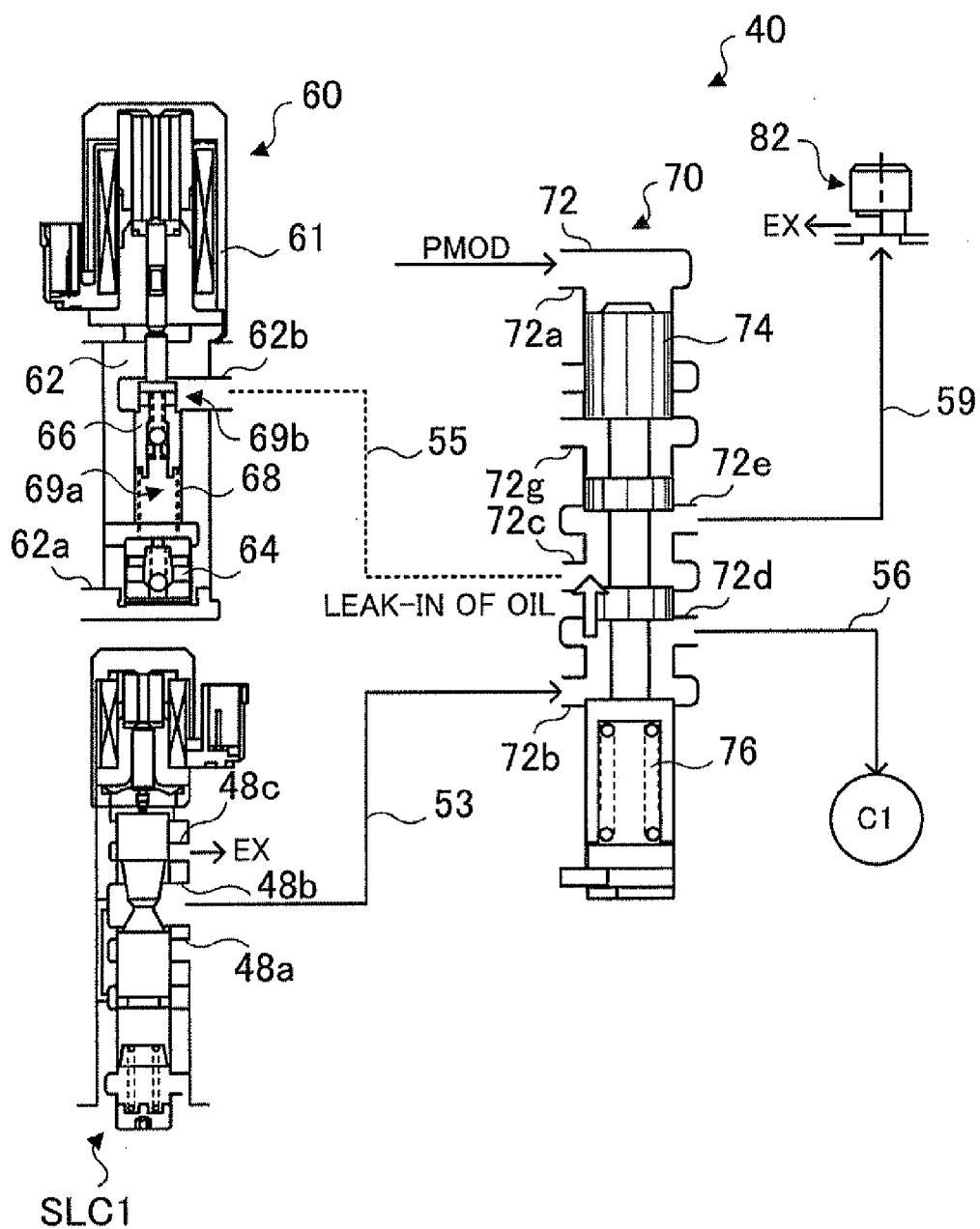
FIG. 7 is an explanatory diagram showing an operation of the hydraulic circuit 40 in a vehicle running with a clutch C1 engaged.

Next, a case in which the vehicle runs with the clutch C1 engaged will be considered. Note that the case of the vehicle running with the clutch C1 engaged corresponds to any case of the first forward speed, the second forward speed, or the third forward speed (refer to the operation table in FIG. 2) in the embodiment. FIG. 7 shows a state of the hydraulic circuit 40 in this case. In this state, as shown in FIG. 7, the C1 relay valve 70 provides communication between the output port 48b of the linear solenoid valve SLC1 and the clutch C1, and shuts off communication between the discharge port 62b of the electromagnetic pump 60 and the clutch C1. Because the C1 relay valve 70 is structured to allow and shut off communications between the ports by moving the spool 74 while the outer wall of the spool 74 slides on the inner wall of the sleeve 72, a certain clearance exists between the inner wall of the sleeve 72 and the outer wall of the spool 74. For this reason, when the high SLC1 pressure from the linear solenoid valve SLC1 is applied to the input port 72b and the output port 72d, oil may leak into the input port 72c adjacent to the input port 72b and the output port 72d, thereby applying a high pressure to the discharge port oil passage 55 and the discharge port 62b of the electromagnetic pump 60 that are connected to the input port 72c. Leak-in of oil is not limited to the above-described case, but there may also be a case in which oil leaks in from adjacent oil passages via joint surfaces of the valve body (not shown). There is no way out for a hydraulic pressure to escape from the electromagnetic pump 60. Therefore, when a hydraulic pressure is introduced into the discharge port 62b, the piston 66 is pressed in the direction in which the spring 68 is compressed by the hydraulic pressure, thus placing the shaft 61e and the plunger 61c of the solenoid 61 in a free state, thereby possibly causing abnormal noise occurrence or breakage due to interference with the case 61a. In addition, if the engine 12 stops running, and accordingly, if the state of the C1 relay valve 70 switches to the state in which the input port 72c on the discharge port oil passage 55 side is communicated with the output port 72d on the C1 oil passage 56 side when the high pressure is applied to the discharge port oil passage 55, the high pressure from the discharge port oil passage 55 is applied to the clutch C1, causing a possibility of unintended engagement of the clutch C1 In the embodiment, the C1 relay valve 70 is provided with the drain port 72e that is communicated with the input port 72c when communication between the input port 72c and the output port 72d is shut off, and the drain port 72e is equipped with the check valve 82 via the drain oil passage 59. Therefore, even if leak-in of the high-pressure oil occurs on the input port 72c side, the oil is drained via the drain port 72e, the drain oil passage 59, and the check valve 82. As a result, the hydraulic pressure inside the discharge port oil passage 55 can always be maintained at an appropriate pressure level, and thus, the inconvenience described above does not occur.

With the power transmission device 20 of the embodiment described above, the C1 relay valve 70 is provided with the drain port 72e that is communicated with the input port 72c (the discharge port oil passage 55 of the electromagnetic pump 60) while the input port 72b (the output port oil passage 53 of the linear solenoid valve SLC1) is communicated with the output port 72d (the C1 oil passage 56 of the clutch C1) and communication between the input port 72c and the output port 72d is shut off, and the drain port 72e is equipped with the check valve 82 via the drain oil passage 59. Therefore, even if leak-in of the high-pressure oil occurs on the input port 72c side, the oil can be drained via the drain port 72e, the drain oil passage 59, and the check valve 82. As a result, the hydraulic pressure equal to or above the preset pressure of the check valve 82 is not applied to the inside of the discharge port oil passage 55, and thus the hydraulic pressure inside the discharge port oil passage 55 can always be maintained at an appropriate pressure level. Thus, it is possible to prevent inconvenience from occurring due to an excessively high hydraulic pressure applied to the discharge port oil passage 55.

Figure 8:
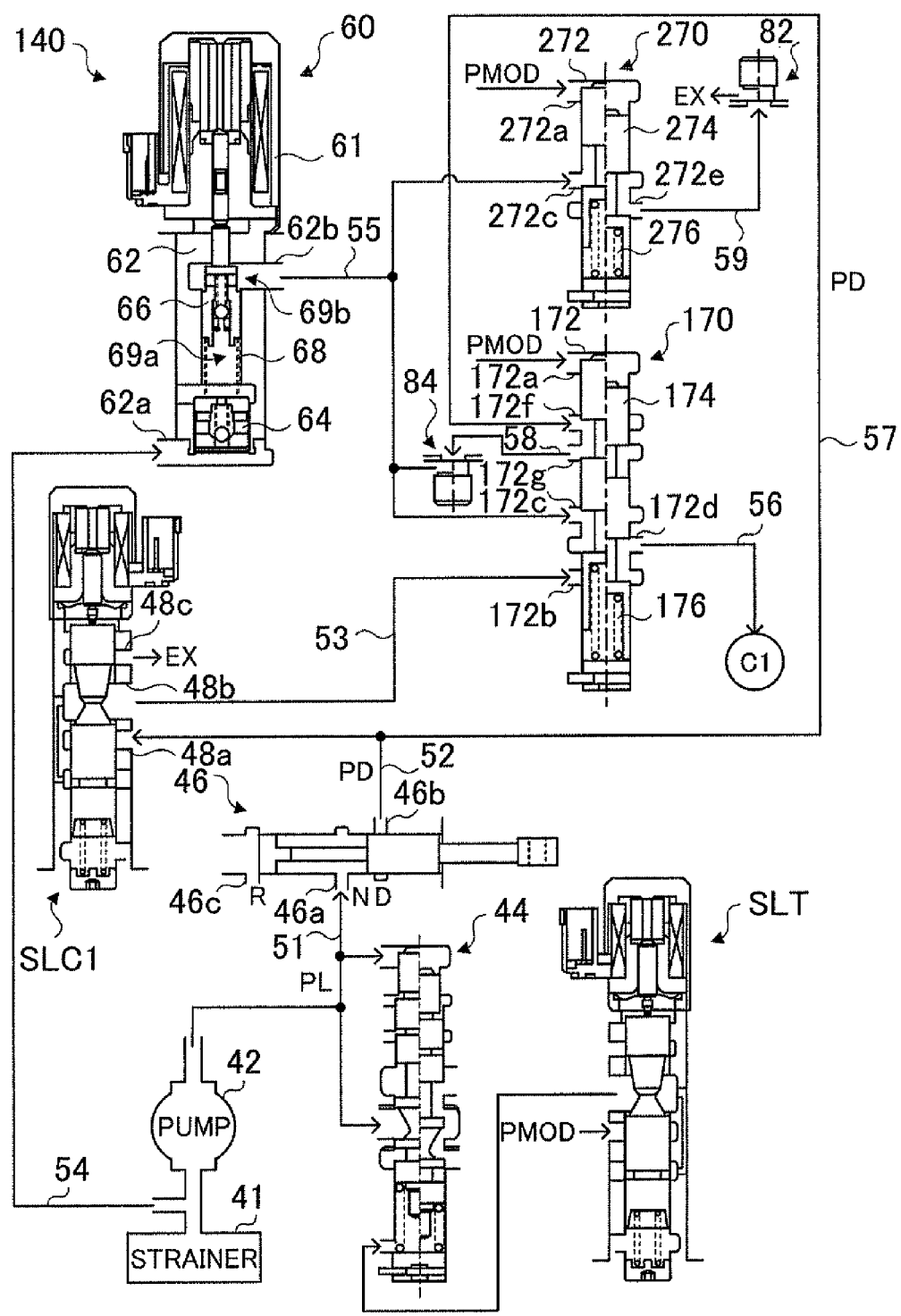
FIG. 8 is a block diagram showing a schematic structure of a hydraulic circuit 140 of a modification example.

In the power transmission device 20 of the embodiment, a single valve (the C1 relay valve 70) performs both the switching between communication between the linear solenoid valve SLC1 (output port oil passage 53) and the clutch C1 (C1 oil passage 56), and communication between the electromagnetic pump 60 (discharge port oil passage 55) and the clutch C1, and the switching between allowing and shutting off of communication between the discharge port oil passage 55 and the drain oil passage 59. However, these switching operations may be performed by separate valves. FIG. 8 shows a hydraulic circuit 140 of a modification example. As shown in FIG. 8, the hydraulic circuit 140 of the modification example is provided with a C1 relay valve 170 and a drain switching valve 270 instead of the C1 relay valve 70. The C1 relay valve 170 includes a sleeve 172 provided with various ports, a spool 174 that slides in the sleeve 172 to connect and disconnect between the ports, and a spring 176 that presses an end face of the spool. As the various ports, the sleeve 172 includes: a signal pressure port 172a receiving the modulator pressure PMOD as a signal pressure to press the spool end face in the direction opposite to an urging force of the spring 176; an input port 172b connected to the output port oil passage 53 to receive the SLC1 pressure; an input port 172c connected to the discharge port oil passage 55 to receive the discharge pressure from the electromagnetic pump 60; an output port 172d connected to the C1 oil passage 56 of the clutch C1; a communication port 172f connected to the drive pressure oil passage 52 via the bypass oil passage upstream side 57; and a communication port 172g connected to the bypass oil passage downstream side 58. In the same way, the drain switching valve 270 also includes a sleeve 272 provided with various ports, a spool 274 that slides in the sleeve 272 to connect and disconnect between the ports, and a spring 276 that presses an end face of the spool. As the various ports, the sleeve 272 includes: a signal pressure port 272a receiving the modulator pressure PMOD as a signal pressure to press the spool end face in the direction opposite to an urging force of the spring 276; an input port 272c connected to the discharge port oil passage 55 to receive the discharge pressure from the electromagnetic pump 60; and a drain port 272e connected to the drain oil passage 59 equipped with the check valve 82.

In the power transmission device 20 of the embodiment, the electromagnetic pump 60 is structured so as to suction hydraulic oil into the first pump chamber 69a via the suction check valve built into the end plate 64 and discharge the hydraulic oil in the second pump chamber 69b from the discharge port 62b when the piston 66 is pushed back by the urging force of the spring 68, and to discharge the hydraulic oil in the first pump chamber 69a from the discharge port 62b via the discharge check valve built into the piston 66 and the second pump chamber 69b when the piston 66 is pushed forward by the electromagnetic force of the solenoid 61. That is, the electromagnetic pump 60 is structured so as to discharge the hydraulic oil twice through the discharge port 62b by reciprocating the piston 66 once. However, the electromagnetic pump 60 may be structured so as to discharge the hydraulic oil only once out from the discharge port 62b by reciprocating the piston 66 once. Specifically, the electromagnetic pump 60 may be structured as an electromagnetic pump of a type that suctions hydraulic oil into a pump chamber when the piston 66 is pushed forward by the electromagnetic force of the solenoid 61 and discharges the hydraulic oil in the pump chamber when the piston 66 is pushed back by the urging force of the spring 68, or may be structured as an electromagnetic pump of a type that suctions hydraulic oil into a pump chamber when the piston 66 is pushed back by the urging force of the spring 68 and discharges the hydraulic oil in the pump chamber when the piston 66 is pushed forward by the electromagnetic force of the solenoid 61. In the electromagnetic pump of the former type, when a high pressure is applied to the discharge port oil passage 55, the same adverse consequence as that of the embodiment may occur in which the plunger 610 and the shaft 61e are placed in a free state, resulting in interference with the case 61a. In the electromagnetic pump of the latter type, when a high pressure is applied to the discharge port oil passage 55, the plunger 61c and the shaft 61e are pressed against the case 61a at the high pressure, and thus, inconvenience such as deformation may occur. Here, description will be made of correspondence relationships between the main elements of the embodiment and the main elements of the invention described in the section entitled Summary of the Invention. In the embodiment, the engine 12 corresponds to a "motor"; the clutches C1 to C3 and the brakes B1 and B2 correspond to "friction engagement elements"; the mechanical oil pump 42 corresponds to a "mechanical pump"; the regulator valve 44 and the linear solenoid valve SLC1 correspond to a "pressure regulating valve"; the electromagnetic pump 60 corresponds to an "electric pump"; the C1 relay valve 70 corresponds to a "switching mechanism"; and the check valve 82 corresponds to a "drain valve". Note that, more in detail, a portion serving as a pressure regulating valve for clutch pressure supply that supplies the hydraulic pressure to the clutch C1 corresponds to the regulator valve 44 and the linear solenoid valve SLC1, and a portion serving as a pressure regulating valve for signal pressure supply that supplies the signal pressure to the signal pressure port 72a of the C1 relay valve 70 corresponds to the regulator valve 44 and the modulator valve (not shown). In the C1 relay valve 70, the signal pressure port 72a corresponds to a "signal pressure port"; the input port 72c corresponds to a "first input port"; the drain port 72e corresponds to a "drain port"; the spool 74 corresponds to a "spool"; and the spring 76 corresponds to an "urging member". The input port 72b corresponds to a "second input port", and the output port 72d corresponds to an "output port". The solenoid 61 corresponds to an "electromagnetic portion"; the plunger 61c and the shaft 61e correspond to a "mover"; the piston 66 corresponds to a "piston portion"; the spring 68 corresponds to an "urging member"; the suction check valve built into the end plate 64 corresponds to a "suction check valve"; and the discharge check valve built into the piston 66 corresponds to a "discharge check valve". Here, the "motor" is not limited to the engine 12 serving as an internal combustion engine, but may be any type of motor, such as an electric motor. The "power transmission mechanism" may be provided with, not limited to the speed change mechanism 30 with six speeds of first to sixth forward speeds, a speed change mechanism with any number of speeds, such as four speeds, five speeds, or eight speeds. In addition, the "power transmission mechanism" is not limited to the automatic transmission, but may be any type of power transmission mechanism that can transmit power from the motor via the friction engagement elements, for example, by connecting the crankshaft 14 of the engine 12 to the wheels 19a and 19b via a clutch and directly via the differential gear 28. The "electric pump" is not limited to the electromagnetic pump 60, but may be any pump, such as an electric pump operated by power from an electric motor, as long as the pump is operated by electric power supply so as to produce a hydraulic pressure. The "pressure regulating valve" is structured as a linear solenoid valve for direct control that directly controls the clutch by producing an optimal clutch pressure from the line pressure PL. However, a linear solenoid may be used as a linear solenoid for pilot control to drive a separate control valve, and the control valve may produce the clutch pressure to control the clutch. As the "pressure regulating valve", a portion serving as a pressure regulating valve for clutch pressure supply is not limited to that formed of the regulator valve 44 and the linear solenoid valve SLC1, but may be that in which, for example, the line pressure PL produced by the regulator valve 44 is directly supplied to the clutch C1 by directly connecting the drive pressure oil passage 52 to the output port oil passage 53 without passing through the linear solenoid valve SLC1. Also, as "pressure regulating valve", a portion serving as a pressure regulating valve for signal pressure supply is not limited to that formed of the regulator valve 44 and the modulator valve, but may be that in which, for example, the line pressure PL produced by the regulator valve 44 is directly supplied to the signal pressure port 72a of the C1 relay valve 70 by directly connecting the line pressure oil passage 51 to the signal pressure port 72a without passing through the modulator valve, or a hydraulic pressure regulated by a solenoid valve is supplied to the signal pressure port 72a of the C1 relay valve 70 by connecting the line pressure oil passage 51 to the signal pressure port 72a via the solenoid valve instead of the modulator valve. The "mover" is not limited to that formed of two members of the plunger 61c and the shaft 61e, but may be that formed of a single member, as long as the mover is moved by the electromagnetic force. The "mover" is also not limited to that structured as a separate body from the piston 66, but may be that structured as a member integrated with the piston 66. Note that, because the embodiment is only an example for giving a specific description of the embodiment of the invention described in the section entitled Summary of the Invention, the correspondence relationships between the main elements of the embodiment and the main elements of the invention described in the section entitled Summary of the Invention do not limit the elements of the invention described in the section entitled Summary of the Invention. That is, any interpretation of the invention described in the section entitled Summary of the Invention should be made based on the description in that section, and the embodiment is merely one specific example of the invention described in the section entitled Summary of the Invention.

The embodiment of the present invention have been described above using the embodiment. However, the present invention is not particularly limited to the embodiment, but can obviously be implemented in various modes without departing from the gist of the present invention.

The present invention can be used in the automotive industry.

What is claimed is:

1. A power transmission device that is mounted on a vehicle equipped with a motor and transmits power from the motor to a driving wheel side via a hydraulically driven friction engagement element, the power transmission device comprising:
   a mechanical pump that is driven by the power from the motor to produce a hydraulic pressure;
   a pressure regulating valve that regulates the hydraulic pressure from the mechanical pump;
   an electric pump that is driven by supplied electric power to produce a hydraulic pressure;
   a switching mechanism that is formed of one or more switching valves, that is connected to a pressure regulating valve oil passage through which oil output from the pressure regulating valve flows, an electric pump oil passage through which oil discharged from the electric pump flows, and a hydraulic servo oil passage communicated with a hydraulic servo of the friction engagement element, and that selectively switches between a first state in which the pressure regulating valve oil passage is communicated with the hydraulic servo oil passage while communication between the electric pump oil passage and the hydraulic servo oil passage is shut off and a second state in which communication between the pressure regulating valve oil passage and the hydraulic servo oil passage is shut off while the electric pump oil passage is communicated with the hydraulic servo oil passage, and
   a drain valve that opens to drain oil when a hydraulic pressure of a drain oil passage in fluid communication with the electric pump oil passage is a preset pressure or more, wherein
   the switching mechanism is further structured to be connected to a drain oil passage equipped with the drain valve, and to allow communication between the electric pump oil passage and the drain oil passage in the first state, and shut off communication between the electric pump oil passage and the drain oil passage in the second state.

2. The power transmission device according to claim 1, wherein
   the switching mechanism includes:
      a signal pressure port connected to the pressure regulating valve oil passage;
      a first input port connected to the electric pump oil passage;
      a drain port connected to the drain oil passage;
      a spool that allows and shuts off communication between the first input port and the drain port; and
      an urging member that urges the spool,
      a second input port connected to the pressure regulating valve oil passage; and
      an output port connected to the hydraulic servo oil passage,
   the switching mechanism is structured so as to allow communication between the first input port and the drain port by moving the spool to one end side by a hydraulic pressure of the preset pressure or more when the hydraulic pressure acts through the signal pressure port, and shut off communication between the first input port and the drain port by moving the spool to the other end side by an urging force of the urging member when the hydraulic pressure of the preset pressure or more does not act through the signal pressure port;
   the switching mechanism is formed of one switching valve that shuts off communication between the first input port and the output port and allows communication between the second input port and the output port by moving the spool to the one end side by a hydraulic pressure of the preset pressure or more when the hydraulic pressure acts through the signal pressure port, and that allows communication between the first input port and the output port and shuts off communication between the second input port and the output port by moving the spool to the other end side by the urging force of the urging member when the hydraulic pressure of the preset pressure or more does not act through the signal pressure port.

3. The power transmission device according to claim 1, wherein
   the electric pump is an electromagnetic pump.

4. The power transmission device according to claim 3, wherein
   the electric pump is a piston pump that includes:
      an electromagnetic portion that generates an electromagnetic force to move a mover;
      a piston portion that moves in conjunction with the mover and slides in a cylinder;
      an urging member that urges the piston portion in a direction opposite to a direction in which the mover is moved by the electromagnetic force;
      a suction check valve connected to a space surrounded by the piston portion and the cylinder; and
      a discharge check valve built into the piston portion, and that suctions oil into the space via the suction valve by reciprocating the piston portion using the electromagnetic portion and the urging member, and discharges the suctioned oil via the discharge check valve.

5. The power transmission device according to claim 4, wherein
   the electromagnetic pump is a pump that includes a case that supports the mover, and is capable of producing a hydraulic pressure as the piston portion is moved by the urging force of the urging member, and
   the mover and the piston portion are structured as separate bodies from each other.

6. The power transmission device according to claim 1, further comprising:
   a control unit that controls the pressure regulating valve so as to supply the hydraulic pressure from the mechanical pump to the hydraulic servo when the mechanical pump is in operation, and controls the electric pump so as to supply the hydraulic pressure from the electric pump to the hydraulic servo when the mechanical pump is not in operation.

* * * * *